(12) United States Patent
Mitra et al.

(10) Patent No.: US 11,997,533 B2
(45) Date of Patent: May 28, 2024

(54) UPLINK SEGMENTATION OFFLOAD TO MODEM

(71) Applicant: QUALCOMM Incorporated, San Diego, CA (US)

(72) Inventors: Alok Mitra, San Diego, CA (US); Sitaramanjaneyulu Kanamarlapudi, San Diego, CA (US); Uppinder Babbar, San Diego, CA (US); Vaibhav Kumar, Encinitas, CA (US); Haim Snapy, San Diego, CA (US); Vamsi Dokku, San Diego, CA (US); Dan Gilboa Waizman, San Diego, CA (US); Joseph Giacalone, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 206 days.

(21) Appl. No.: 17/489,753

(22) Filed: Sep. 29, 2021

(65) Prior Publication Data
US 2023/0098349 A1     Mar. 30, 2023

(51) Int. Cl.
*H04W 28/06*     (2009.01)
*H04L 47/36*     (2022.01)
(Continued)

(52) U.S. Cl.
CPC ............ *H04W 28/06* (2013.01); *H04L 47/36* (2013.01); *H04L 69/161* (2013.01); *H04L 69/22* (2013.01); *H04W 80/06* (2013.01)

(58) Field of Classification Search
None
See application file for complete search history.

(56) References Cited

U.S. PATENT DOCUMENTS 8,825,900 B1 *  9/2014  Gross, IV  ............... H04L 47/31
                                                        709/238
9,641,435 B1 *  5/2017  Sivaramakrishnan ......................
                                                        H04L 69/166
(Continued)

OTHER PUBLICATIONS

International Search Report and Written Opinion—PCT/US2022/074649—ISA/EPO—dated Nov. 24, 2022.

*Primary Examiner* — Duc T Duong
(74) *Attorney, Agent, or Firm* — Kevin M. Donnelly; ArentFox Schiff LLP

(57) ABSTRACT

This disclosure provides a method, apparatus, and computer-readable medium for wireless communication at a modem, comprising receiving, via an interface with a host, an internet protocol (IP) packet including a first transport protocol header and a first IP header. The IP packet has a size greater than a maximum transport unit (MTU) size allowable for each packet transmitted over a communication link. The modem segments the IP packet into a plurality of segments based on a segment size indicated by a segmentation policy. Each segment includes a respective derived segment transport protocol header and a respective derived segment IP header derived from the IP packet. Each of these derived headers includes at least one field based on the segmentation policy, and each of the segment transport protocol headers includes a checksum for the respective segment. Additionally, the modem transmits the plurality of segments over the communication link.

27 Claims, 17 Drawing Sheets

(51) Int. Cl.
*H04L 69/16* (2022.01)
*H04L 69/166* (2022.01)
*H04L 69/22* (2022.01)
*H04L 69/24* (2022.01)
*H04W 80/06* (2009.01)

(56) References Cited

U.S. PATENT DOCUMENTS

| | | | | |
|---|---|---|---|---|
| 2005/0281287 | A1* | 12/2005 | Niinomi | H04L 49/9063 |
| | | | | 370/474 |
| 2006/0018315 | A1* | 1/2006 | Baratakke | H04L 69/161 |
| | | | | 370/389 |
| 2007/0223472 | A1* | 9/2007 | Tachibana | H04L 47/36 |
| | | | | 370/473 |
| 2010/0322249 | A1* | 12/2010 | Thathapudi | H04L 69/166 |
| | | | | 370/395.1 |
| 2015/0081863 | A1* | 3/2015 | Garg | H04L 41/00 |
| | | | | 709/223 |
| 2017/0170986 | A1* | 6/2017 | Kumar | H04L 12/4633 |
| 2018/0338267 | A1* | 11/2018 | Kinoshita | H04L 69/161 |
| 2019/0104058 | A1* | 4/2019 | Filsfils | H04L 43/106 |
| 2019/0140967 | A1* | 5/2019 | Deval | H04L 45/74 |
| 2019/0387079 | A1 | 12/2019 | Pismenny et al. | |
| 2020/0068048 | A1* | 2/2020 | Hermesh | H04L 69/161 |
| 2021/0250281 | A1* | 8/2021 | Li | H04L 45/302 |
| 2023/0327983 | A1* | 10/2023 | Song | H04L 45/123 |
| | | | | 370/392 |

\* cited by examiner

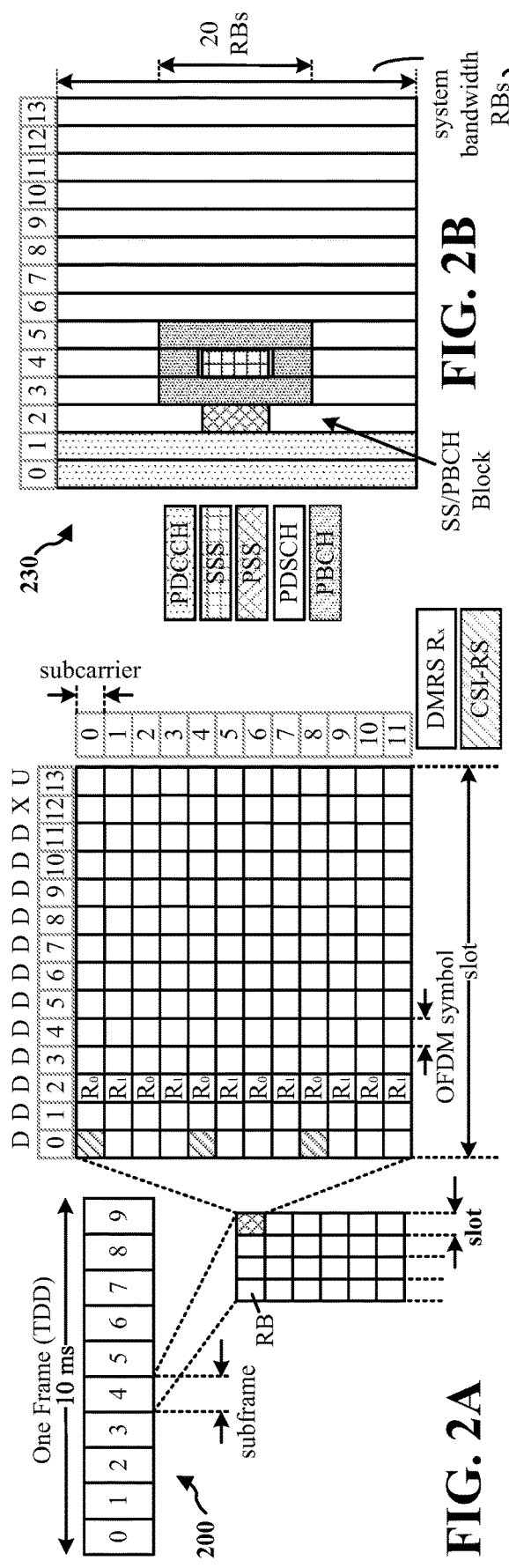
FIG. 2A
FIG. 2B
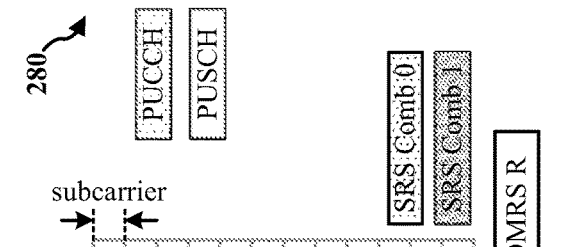
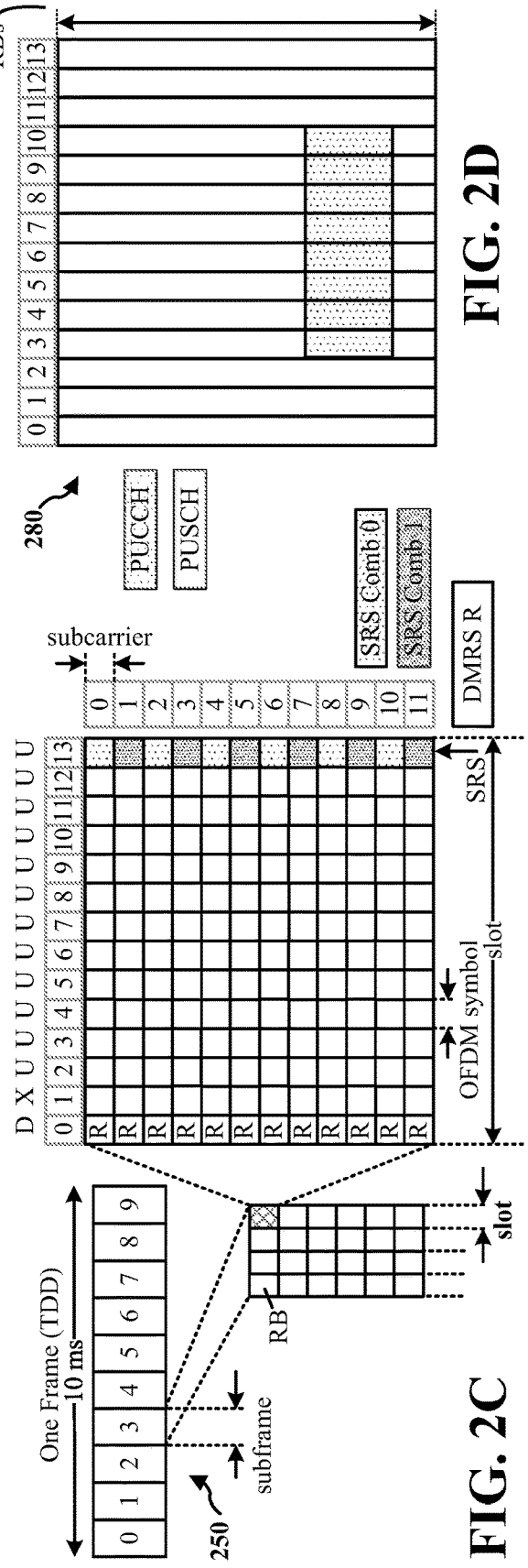
FIG. 2C
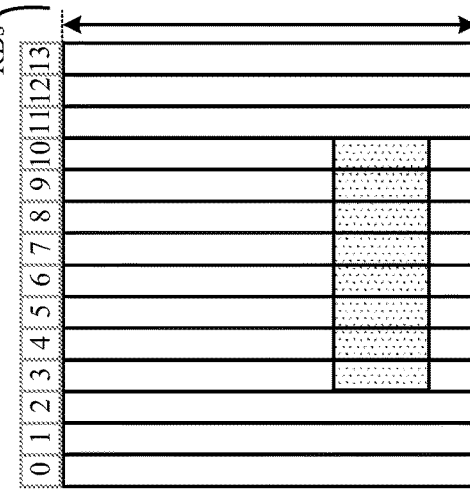
FIG. 2D

FIG. 4

IPv4 header format

| Offsets | Octet | | 0 | | | | | | | | 1 | | | | | | | | 2 | | | | | | | | 3 | | | | | | |
|---|---|---|---|---|---|---|---|---|---|---|---|---|---|---|---|---|---|---|---|---|---|---|---|---|---|---|---|---|---|---|---|---|
| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | Version | | | | IHL | | | | DSCP | | | | | | ECN | | Total Length | | | | | | | | | | | | | | | |
| 4 | 32 | Identification | | | | | | | | | | | | | | | | Flags | | | Fragment Offset | | | | | | | | | | | | |
| 8 | 64 | Time to live | | | | | | | | Protocol | | | | | | | | Header Checksum | | | | | | | | | | | | | | | |
| 12 | 96 | Source IP Address | | | | | | | | | | | | | | | | | | | | | | | | | | | | | | | |
| 16 | 128 | Destination IP Address | | | | | | | | | | | | | | | | | | | | | | | | | | | | | | | |
| 20 | 160 | Options (if IHL > 5) | | | | | | | | | | | | | | | | | | | | | | | | | | | | | | | |
| ... | ... | | | | | | | | | | | | | | | | | | | | | | | | | | | | | | | | |
| 60 | 480 | | | | | | | | | | | | | | | | | | | | | | | | | | | | | | | | |

400
410

IPv6 Fixed header format

| Offsets | Octet | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | Version | | | | Traffic class | | | | | | | | Flow label | | | | | | | | | | | | | | | | | | | |
| 4 | 32 | Payload length | | | | | | | | | | | | | | | Next Header | | | | | | | | Hop limit | | | | | | | |
| 8 | 64 | Source address | | | | | | | | | | | | | | | | | | | | | | | | | | | | | | |
| 12 | 96 | | | | | | | | | | | | | | | | | | | | | | | | | | | | | | | | |
| 16 | 128 | | | | | | | | | | | | | | | | | | | | | | | | | | | | | | | | |
| 20 | 160 | | | | | | | | | | | | | | | | | | | | | | | | | | | | | | | | |
| 24 | 192 | Destination address | | | | | | | | | | | | | | | | | | | | | | | | | | | | | | |
| 28 | 224 | | | | | | | | | | | | | | | | | | | | | | | | | | | | | | | | |
| 32 | 256 | | | | | | | | | | | | | | | | | | | | | | | | | | | | | | | | |
| 36 | 288 | | | | | | | | | | | | | | | | | | | | | | | | | | | | | | | | |

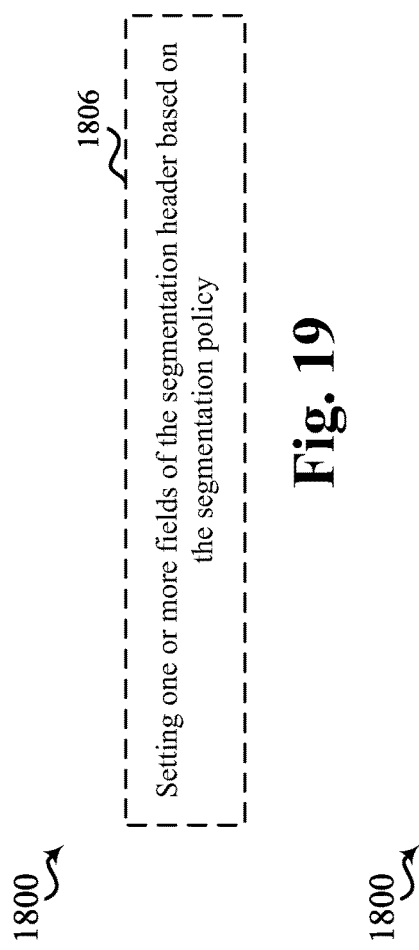

UPLINK SEGMENTATION OFFLOAD TO MODEM

BACKGROUND

Technical Field

The present disclosure relates generally to wireless communication systems, and more particularly, to devices including a host that offloads uplink segmentation of packets to a modem.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology.

A computing device may include a host and a modem. The host may include, for example, an application processor that executes software, which may be stored in a memory. The modem may include a separate processing system for communication processing, such as layers of wireless communications protocols. The host may provide internet protocol (IP) packets to the modem for the modem to transmit via a communication link. The communication link may have a maximum transport unit (MTU) size allowable for each packet transmitted over the communication link. Conventionally, the modem configures the host with the MTU size, and the host limits the size of the IP packets to the MTU size such that the IP packets can be transmitted over the communication link. For example, the host may segment data for transmission into multiple transport protocol segments such as transport control protocol (TCP) segments or user datagram protocol (UDP) segments. Segmentation by the host, however, may have disadvantages. For example, an MTU size for a wireless communication link may be on the order of 1500 bytes. Conversely, the interface between the host and the modem may be, for example, Ethernet, peripheral component interconnect express (PCIe), or universal serial bus (USB), which may be able to handle larger packets such as packets having a 16 bit length indicator corresponding to 64 kilobits (kb). Accordingly, segmenting data packets at the host based on an MTU size may be inefficient for transfer over the interface to the modem.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a method of wireless communication by a modem, including receiving, via an interface with a host, an internet protocol (IP) packet including a first transport protocol header and a first IP header, the IP packet having a size greater than a maximum transport unit (MTU) size allowable for each packet transmitted over a communication link. The method further includes segmenting the IP packet into a plurality of segments based on a segment size indicated by a segmentation policy for the IP packet for the communication link, each segment including a respective segment transport protocol header derived from the first transport protocol header and a respective segment IP header derived from the first IP header, each of the segment transport protocol headers and each of the segment IP headers including at least one field based on the segmentation policy, and each of the segment transport protocol headers including a checksum for the respective segment. Additionally, the method further includes transmitting the plurality of segments over the communication link.

Another example aspect includes an apparatus for wireless communication at a modem, including a memory and a processor in communication with the memory. The processor is configured to receive, via an interface with a host, an IP packet including a first transport protocol header and a first IP header, the IP packet having a size greater than a MTU size allowable for each packet transmitted over a communication link. The processor is further configured to segment the IP packet into a plurality of segments based on a segment size indicated by a segmentation policy for the IP packet for the communication link, each segment including a respective segment transport protocol header derived from the first transport protocol header and a respective segment IP header derived from the first IP header, each of the segment transport protocol headers and each of the segment IP headers including at least one field based on the segmentation policy, and each of the segment transport protocol headers including a checksum for the respective segment. Additionally, the processor further configured to transmit the plurality of segments over the communication link.

Another example aspect includes an apparatus for wireless communication at a modem, including means for receiving, via an interface with a host, an IP packet including a first transport protocol header and a first IP header, the IP packet having a size greater than a MTU size allowable for each packet transmitted over a communication link. The apparatus further includes means for segmenting the IP packet into a plurality of segments based on a segment size indicated by a segmentation policy for the IP packet for the communication link, each segment including a respective segment transport protocol header derived from the first transport protocol header and a respective segment IP header derived from the first IP header, each of the segment transport protocol headers and each of the segment IP headers including at least one field based on the segmentation policy, and each of the segment transport protocol headers including a checksum for the respective segment. Additionally, the apparatus further includes means for transmitting the plurality of segments over the communication link.

Another example aspect includes a computer-readable medium including stored instructions, for wireless communication at a modem, executable by a processor to receive, via an interface with a host, an IP packet including a first transport protocol header and a first IP header, the IP packet having a size greater than a MTU size allowable for each packet transmitted over a communication link. The instructions are further executable to segment the IP packet into a plurality of segments based on a segment size indicated by a segmentation policy for the IP packet for the communication link, each segment including a respective segment transport protocol header derived from the first transport protocol header and a respective segment IP header derived from the first IP header, each of the segment transport protocol headers and each of the segment IP headers including at least one field based on the segmentation policy, and each of the segment transport protocol headers including a checksum for the respective segment. Additionally, the instructions are further executable to transmit the plurality of segments over the communication link.

In some implementations, the IP packet includes a segmentation header that indicates the segment size and the segmentation policy is based on one or more fields of the segmentation header.

In some implementations, the segmentation header includes a header type field having a value indicating an uplink segmentation offload for the IP packet.

In some implementations, the segmentation header includes a field having a value indicating a size of an additional header, between the segmentation header and the first IP header, for a link layer protocol.

In some implementations, segmenting the IP packet into the plurality of segments includes selectively incrementing or not incrementing an identification field in the segment IP header in each of the plurality of segments based on the segmentation policy.

In some implementations, each segment transport protocol header is a user datagram protocol (UDP) header, and segmenting the IP packet includes setting the checksum to zero for each of the plurality of segments based on the segmentation policy.

In some implementations, the modem negotiates the segmentation policy for the IP packet for the communication link with the host. Negotiating the segmentation policy may include configuring enablement of an uplink segmentation offload for one or more endpoints associated with the communication link. Negotiating the segmentation policy may include configuring a range of IP identification values to include in the derived IP header of each of the plurality of segments.

In some implementations, each segment IP header is an IPv4 header, and segmenting the IP packet into the plurality of segments includes, for each segment: updating a total length field of the segment IP header based on the segment size and an actual number of bytes in the segment; and calculating an IP header checksum for the segment.

In some implementations, the segment IP header is an IPv6 header, and segmenting the IP packet into the plurality of segments includes, for each segment: updating a payload length field of the segment IP header based on the segment size and an actual number of bytes in the segment; and copying other fields of the segment IP header from the IP header.

In some implementations, the first transport protocol header is a transport control protocol (TCP) header, and segmenting the IP packet into the plurality of segments includes, for each segment: setting a sequence number of the segment transport protocol header; updating one or more flags in the segment transport protocol header; and copying other fields of the segment transport protocol header from the first transport protocol header. For example, updating the one or more flags in the segment transport protocol header may include: setting a finish (FIN) flag, push function (PSH) flag, and reset (RST) flag of a last segment based on a respective flag of the first transport protocol header; setting a congestion window reduced (CWR) flag of a first segment of the plurality of segments based on a CWR flag of the first transport protocol header; and copying an acknowledgment (ACK) flag and an urgent (URG) flag from the first transport protocol header to each segment transport protocol header.

An example aspect includes a method of wireless communication by a host of a modem. The method may include adding a segmentation header indicating uplink segmentation offload to an IP packet that includes a first transport protocol header and a first IP header, the IP packet having a size greater than a MTU size allowable for each packet transmitted over a communication link by the modem, where the segmentation header is based on a segmentation policy including at least a segment size. The method may include providing the IP packet, via an interface, to the modem for transmission as a plurality of segments.

Another example aspect includes an apparatus for wireless communication by a host of a modem. The apparatus includes a memory; and a processor in communication with the memory and configured to add a segmentation header indicating uplink segmentation offload to an IP packet that includes a first transport protocol header and a first IP header, the IP packet having a size greater than a MTU size allowable for each packet transmitted over a communication link by the modem, where the segmentation header is based on a segmentation policy including at least a segment size. The processor is configured to provide the IP packet, via an interface, to the modem for transmission as a plurality of segments.

Another example aspect includes an apparatus for wireless communication by a host of a modem. The apparatus includes means for adding a segmentation header indicating uplink segmentation offload to an IP packet that includes a first transport protocol header and a first IP header, the IP packet having a size greater than a MTU size allowable for each packet transmitted over a communication link by the modem, where the segmentation header is based on a segmentation policy including at least a segment size. The apparatus includes means for providing the IP packet, via an interface, to the modem for transmission as a plurality of segments.

Another example aspect includes a computer-readable medium including stored instructions, for wireless communication by a host of a modem, executable by a processor to add a segmentation header indicating uplink segmentation offload to an IP packet that includes a first transport protocol header and a first IP header, the IP packet having a size greater than a MTU size allowable for each packet transmitted over a communication link by the modem, where the segmentation header is based on a segmentation policy including at least a segment size. The instructions are executable to provide the IP packet, via an interface, to the modem for transmission as a plurality of segments.

In some implementations, the segmentation header includes the segment size, and further comprising setting one or more fields of the segmentation header based on the segmentation policy.

In some implementations, the segmentation header includes a field indicating a size of an additional header between the segmentation header and the first IP header for a link layer protocol.

In some implementations, the segmentation policy indicates whether to increment an identification field of a respective segment IP header in each of the plurality of segments.

In some implementations, the segmentation policy indicates whether to set a UDP header checksum to zero for each of the plurality of segments transmitted by the modem.

In some implementations, the host negotiates the segmentation policy for the communication link with the modem. Negotiating the segmentation policy may include configuring enablement of uplink segmentation offload for one or more endpoints associated with the communication link. Negotiating the segmentation policy may include configuring a range of IP identification values for the modem to include in a derived IP header of each of the plurality of segments.

To the accomplishment of the foregoing and related ends, the one or more aspects comprise the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G new radio (NR) frame.

FIG. 2B is a diagram illustrating an example of downlink (DL) channels within a 5G NR subframe.

FIG. 2C is a diagram illustrating an example of a second 5G NR frame.

FIG. 2D is a diagram illustrating an example of uplink (UL) channels within a 5G NR subframe.

FIG. 4 is a diagram illustrating an example internet protocol (IP)v4 header.

FIG. 5 is a diagram illustrating an example IPv6 header.

FIG. 19 is a flowchart of an example method of generating a segmentation header.

FIG. 20 is a flowchart of an example method for a host to determine a segmentation policy.

DETAILED DESCRIPTION

Figure 1:
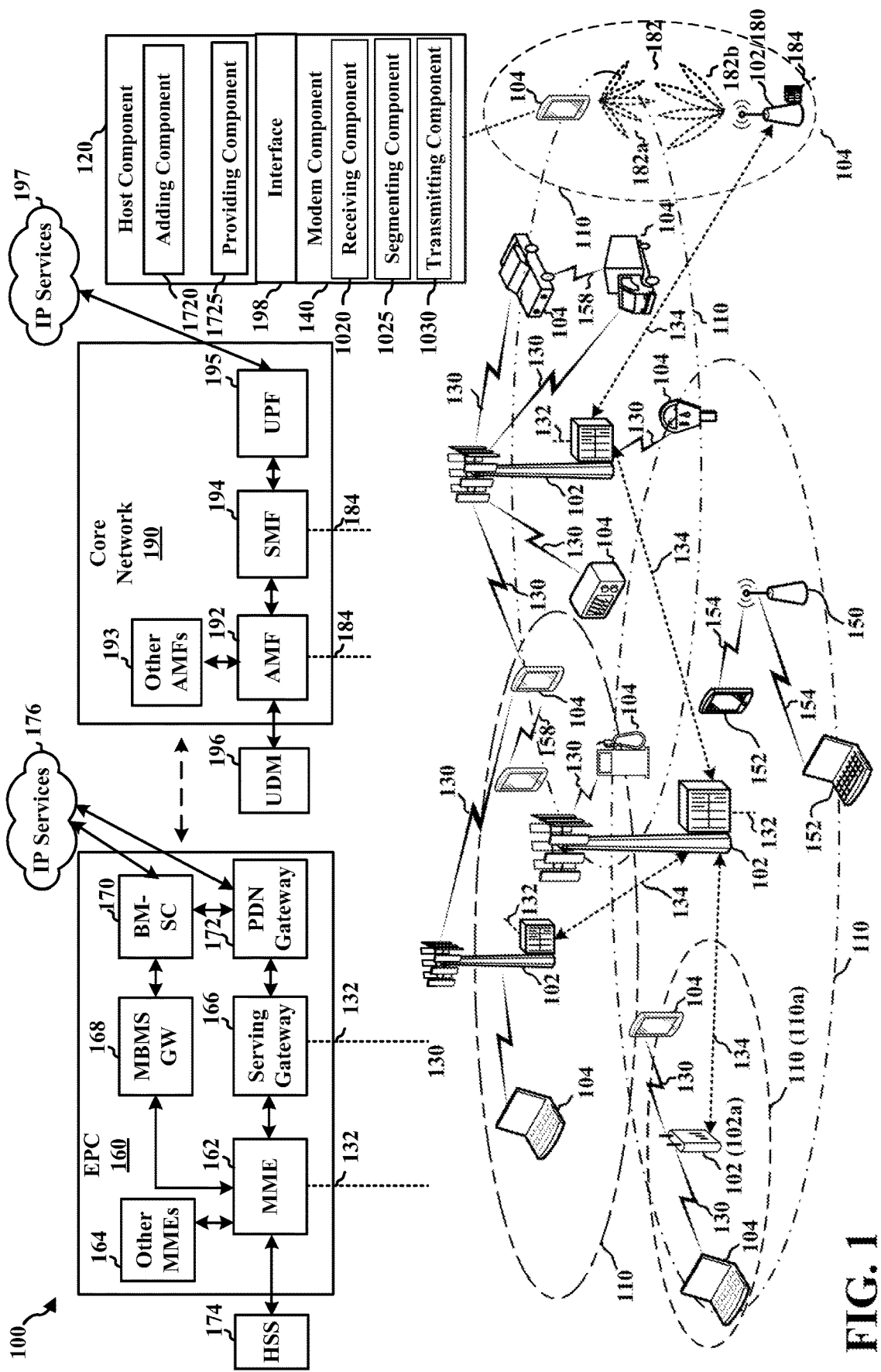
FIG. 1 is a diagram illustrating an example of a wireless communication system including an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those of ordinary skill in the art that these concepts may be practiced without these specific details. In some instances, structures and components are shown in block diagram form in order to avoid obscuring such concepts.

Various aspects of the present disclosure generally relate to devices including a host that offloads uplink segmentation of packets to a modem. Instead of the host segmenting packets based on an MTU size, the host may output IP packets larger than the MTU size over an interface to the modem. The host may add a segmentation header to one or more of the IP packets to indicate that the IP packets including the segmentation header are to be segmented by the modem. The modem may then segment IP packets that are larger than the MTU size into a plurality of respective segments based on a segment size indicated by a segmentation policy for IP packets to be transmitted over a communication link between the device and an endpoint. In some examples, the segmentation policy for the endpoint may be negotiated between the host and the modem. In some other examples, the segmentation header of the IP packet may indicate one or more parameters of the segmentation policy, such as a segmentation size. In some examples, as part of performing segmentation of an IP packet, the modem includes, with each segment, both a respective segment transport protocol header, derived from a transport protocol header of the IP packet, and a respective segment IP header, derived from an IP header of the IP packet. In some such examples, each of the segment transport protocol headers and each of the segment IP headers includes at least one field based on the segmentation policy. Additionally, in some examples, each of the segment transport protocol headers includes a checksum for the respective segment. The modem may then transport the plurality of segments including the respective segment transport protocol headers and the respective segment IP headers over the communication link to the endpoint.

Particular implementations of the subject matter described in this disclosure can be implemented to realize one or more of the following potential advantages. Offloading segmentation of packets from the host to the modem may shift processing performed by the more generalized application processor to a more specialized processing system within the modem. The shift of processing may free up resources of the host to perform other operations faster. Additionally, transfer of data over the interface between the host and the modem may be more efficient for larger packets.

Several aspects of telecommunication systems will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communication system including an access network 100. The wireless communication system (also referred to as a wireless wide area network (WWAN)) includes base stations 102, UEs 104, an Evolved Packet Core (EPC) 160, and another core network 190 (for example, a 5G Core (5GC)). The base stations 102 may include macrocells (high power cellular base station) or small cells (low power cellular base station). The macrocells include base stations. The small cells include femtocells, picocells, and microcells.

In an aspect, one or more of the UEs 104 may include a modem component 140 and a host component 120 configured for offload of segmentation of uplink packets from the most component 120 to the modem component 140. The host component 120 may include an adding component 1720 configured to add a segmentation header indicating offload of uplink packet segmentation to an IP packet that includes a transport protocol header and an IP header. The IP packet has a size greater than a MTU size of packets transmitted over a communication link by the modem. The segmentation header is based on a segmentation policy including at least a segment size. The host component 120 includes a providing component 1725 configured to provide the IP packet, via the interface 198 to the modem component 140 for transmission as a plurality of segments.

In an aspect, the modem component 140 may include a receiving component 1020, a segmenting component 1025, and a transmitting component 1030. The receiving component 1020 may be configured to receive, via the interface 198 with the host component 120, an IP packet including a first transport protocol header and a first IP header. The IP packet has a size greater than a MTU size allowable for each packet transmitted over a communication link. The segmenting component 1025 is configured to segment the IP packet into a plurality of segments based on a segment size indicated by a segmentation policy for the IP packet for the communication link. Each segment includes a respective segment transport protocol header derived from the first transport protocol header and a respective segment IP header derived from the first IP header. Each of the segment transport protocol headers and each of the segment IP headers includes at least one field based on the segmentation policy. Each of the segment transport protocol headers includes a checksum for the respective segment. The transmitting component 1030 is configured to transmit the plurality of segments over the communication link.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (for example, an S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over third backhaul links 134 (for example, X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102a may have a coverage area 110a that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 130 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 130 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400 MHz, among other examples) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communication system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102*a* may operate in a licensed or an unlicensed frequency spectrum. When operating in an unlicensed frequency spectrum, the small cell 102*a* may employ NR and use the same 5 GHz unlicensed frequency spectrum as used by the Wi-Fi AP 150. The small cell 102*a*, employing NR in an unlicensed frequency spectrum, may boost coverage to or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182*a*. The UE 104 may receive the beamformed signal from the base station 180 in one or more receive directions 182*b*. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, or heart monitor, among other examples). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description presented herein applies also to a 5G/NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where y is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology p=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
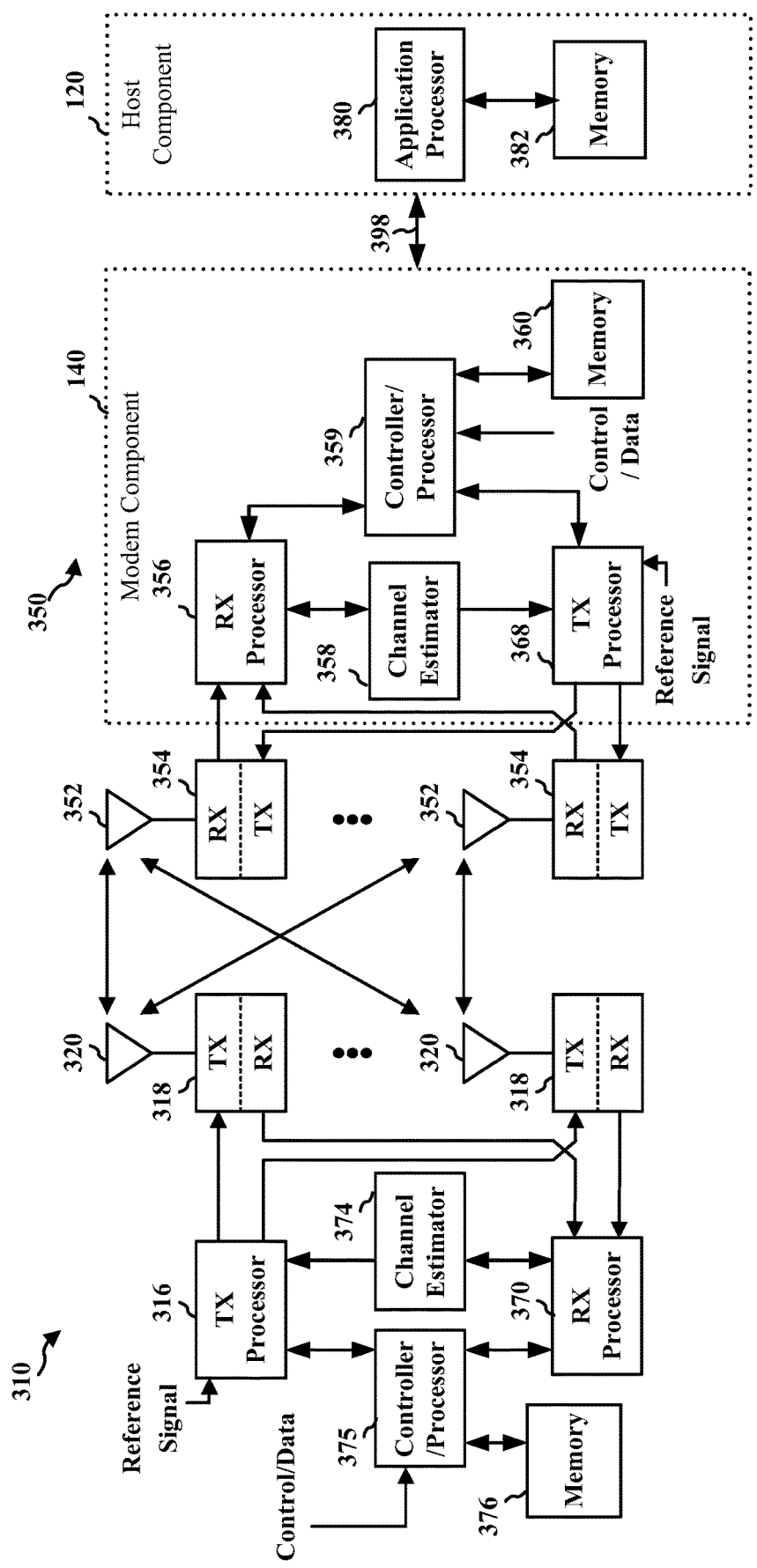
FIG. 3 is a diagram illustrating an example of a base station and a user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (for example, MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 368, the RX processor 356, and the controller/processor 359 may be configured to perform aspects in connection with the modem component 140 of FIG. 1.

The UE 350 may include an application processor 380 and a memory 382 coupled with the modem component 140 via an interface 398. The application processor 380 may be configured to perform aspects in connection with the host component 120 of FIG. 1.

FIG. 4 is a diagram 400 illustrating an example of an IPv4 header 410. The IPv4 header may include multiple fields arranged according to a format. The IPv4 header 410 may be 20 octets or bytes in length up to 60 bytes if indicated by an IP header length (IHL) field. The IPv4 header 410 may include a version field, IHL field, differentiated services code point (DSCP) field, explicit congestion notification (ECN) field, total length field, identification field, flags field, fragmentation offset field, time to live field, protocol field, header checksum field, source IP address field, and destination IP address field. The IPv4 header 410 may optionally include an options field if indicated by the IHL field.

FIG. 5 is a diagram 500 illustrating an example of an IPv6 header 510. The IPv6 header 510 may have a fixed length of 40 octets or bytes. The IPv6 header 510 may include a version field, traffic class field, flow label field, payload length field, next header field, hop limit field, source address field, and destination address field.

Figure 6:
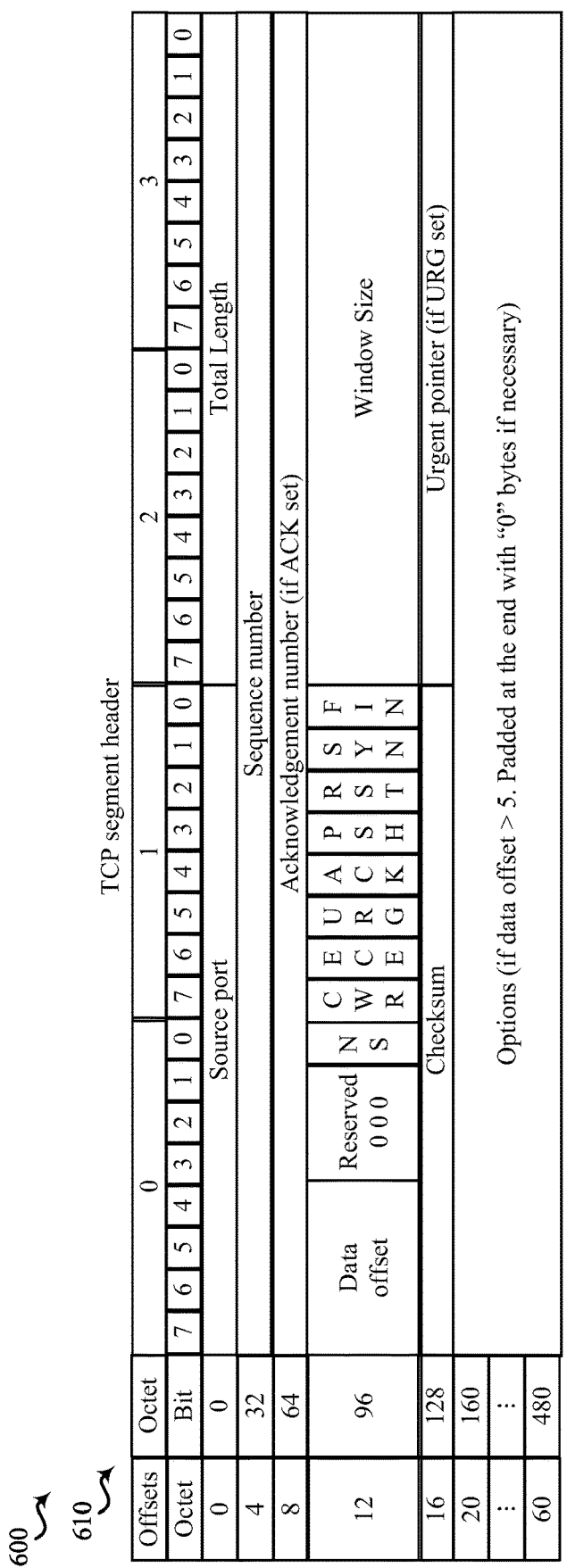
FIG. 6 is a diagram illustrating an example transport control protocol (TCP) header.

FIG. 6 is a diagram 600 illustrating an example of a TCP segment header 610. The TCP segment header 610 is an example of a transport protocol header. The TCP segment header 610 has a length of 20 octets or bytes, and can be extended to up to 60 bytes if indicated by a data offset field. The TCP segment header 610 includes a source port field, a destination port field, a sequence number field, an acknowledgment number field, a data offset field, three reserved bits, multiple flags, a window size field, a checksum field, and an urgent pointer field. The multiple flags may include a ECN-nonce (NS) flag, a congestion window reduced (CWR) flag, an ECN echo (ECE) flag, an urgent (URG) flag, an acknowledgment (ACK) flag, a push function (PSH) flag, a reset (RST) flag, a synchronize (SYN) flag, and a finish (FIN) flag.

Figure 7:
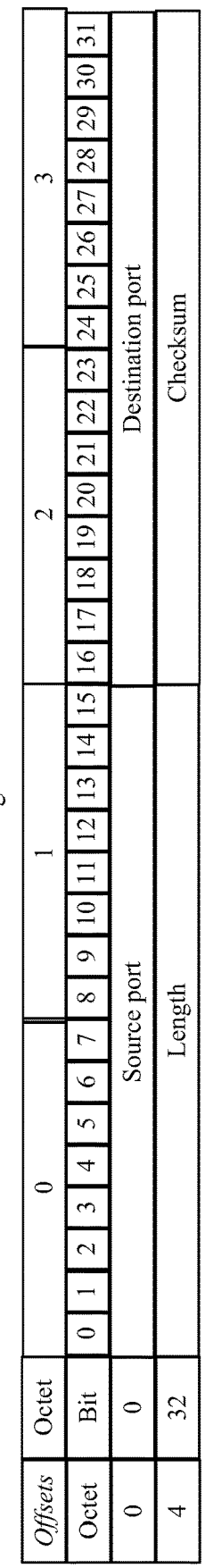
FIG. 7 is a diagram illustrating an example user datagram protocol (UDP) header.

FIG. 7 is a diagram 700 illustrating an example of a UDP datagram header 710. The UDP datagram header 710 is an example of a transport protocol header. The UDP datagram header 710 has a length of 8 octets or bytes. The UDP datagram header 710 includes a source port field, a destination port field, a length field, and a checksum field.

Figure 8:
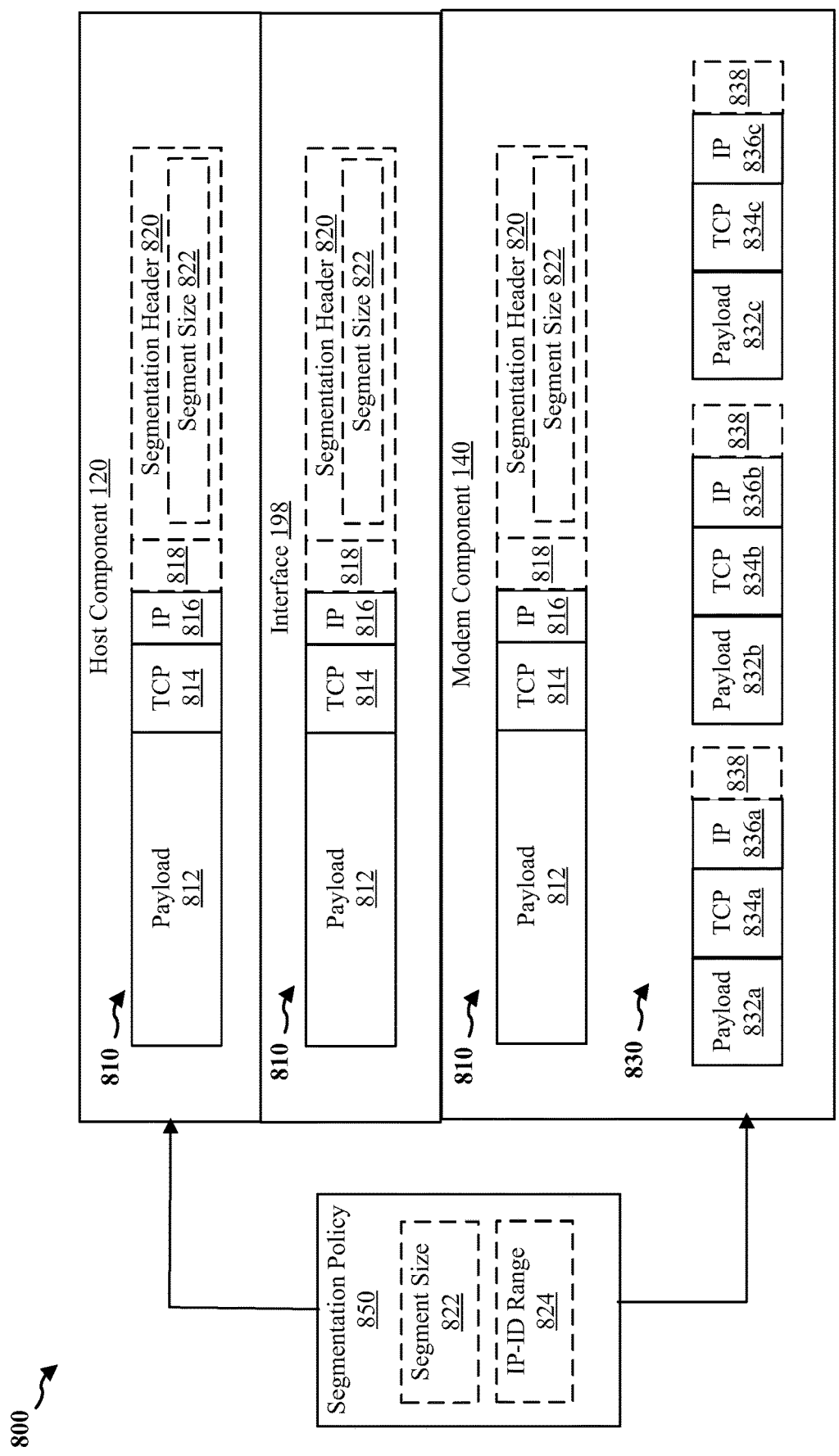
FIG. 8 is a diagram illustrating an example of segmenting an IP packet into a plurality of segments.

FIG. 8 is a diagram 800 illustrating an example of a process for offloading segmentation of uplink packets from a host component 120 to a modem component 140. Generally, the host component 120 may generate an IP packet 810 including a payload 812, a transport protocol header 814, and an IP header 816. The payload 812 may have a length up to a maximum IP payload length of 64 kb corresponding to a 16 bit length indicator. The size of the payload 812 may be greater than an MTU size for a communication link between the modem component 140 and an endpoint. The transport protocol header 814 may be a header for a transport protocol such as TCP or UDP. In some implementations, other transport protocols such as stream control transmission protocol (SCTP) may be supported. The IP header 816 may be, for example, an IPv4 header 410 or an IPv6 header 510. In some implementations, the IP packet 810 may include an additional header 818, for example, between the IP header 816 and the segmentation header 820. The additional header 818 may be a link layer protocol header such as an Ethernet header or Wi-Fi header.

The offload of uplink packet segmentation may be based on a segmentation policy 850. The segmentation policy 850 may specify one or more parameters for offloading segmentation of uplink packets. For example, the segmentation policy 850 may specify a segment size 822 or an IP-ID range. In some implementations, the segmentation policy 850 may be negotiated between the host component 120 and the modem component 140 for a communication link or an endpoint reached via the communication link. For example, the negotiation may be per endpoint for a WWAN communication link to enable offloading segmentation of uplink packets for the concerned WWAN endpoint. Enabling offloading segmentation of uplink packets may designate a particular header format (such as including segmentation header 820). As an example of negotiation, the modem component 140 may be associated with an application programming interface (API) or driver that allows the host to request capabilities of the modem component 140 and specify parameter values. For instance, the modem component 140 may provide the MTU size to the host component 120 and the host component 120 may select a segment size 822 that is less than or equal to the MTU size. In some implementations, the host component 120 may add a segmentation header 820 to the IP packet 810. As discussed in further detail below with respect to FIG. 9, the segmentation header 820 may include one or more fields that define parameters for offloading segmentation of uplink packets. For example, the segmentation header 820 may include the segment size 822 or the IP-ID range 824. In some implementations, the negotiation may provide default values for the segmentation parameters. If a segmentation header 820 is added to an IP packet, the values from the segmentation header 820 may override the default values.

The host component 120 may output the IP packet 810 to the interface 198. The interface 198 may transfer the IP packet 810 to the modem component 140 without changing the content of the IP packet 810. Accordingly, the modem component 140 may receive the IP packet 810 from the interface 198. The modem component 140 may determine that the size of the IP packet 810 is greater than the MTU size for the communication link. For example, the modem component 140 may compare a total length field of an IPv4 packet or a payload length of an IPv6 packet with the MTU size. The modem component 140 may determine that offloading segmentation for the IP packet is enabled based on the segmentation policy 850 or the segmentation header 820.

The modem component 140 may segment the IP packet 810 into a plurality of segments 830 based on the segment size 822 indicated by the segmentation policy 850 for the IP packet 810 for the communication link. Each segment 830 may include a payload 832 (such as 832*a*, 832*b*, or 832*c*) respective segment transport protocol header 834 (such as 834*a*, 834*b*, or 834*c*) derived from the transport protocol header 814 of the IP packet 810 and a respective segment IP header 836 (such as 836*a*, 836*b*, 836*c*) derived from the IP header 816 of the IP packet 810. Each of the segment transport protocol headers 834 and each of the segment IP headers 836 may include at least one field based on the segmentation policy 850. Each of the segment transport protocol headers 834 includes a checksum for the respective segment 830. In implementations where the IP packet 810 includes the additional header 818, the modem component 140 may copy the additional header 818 to each segment 830 as an additional header 838.

Figure 9:
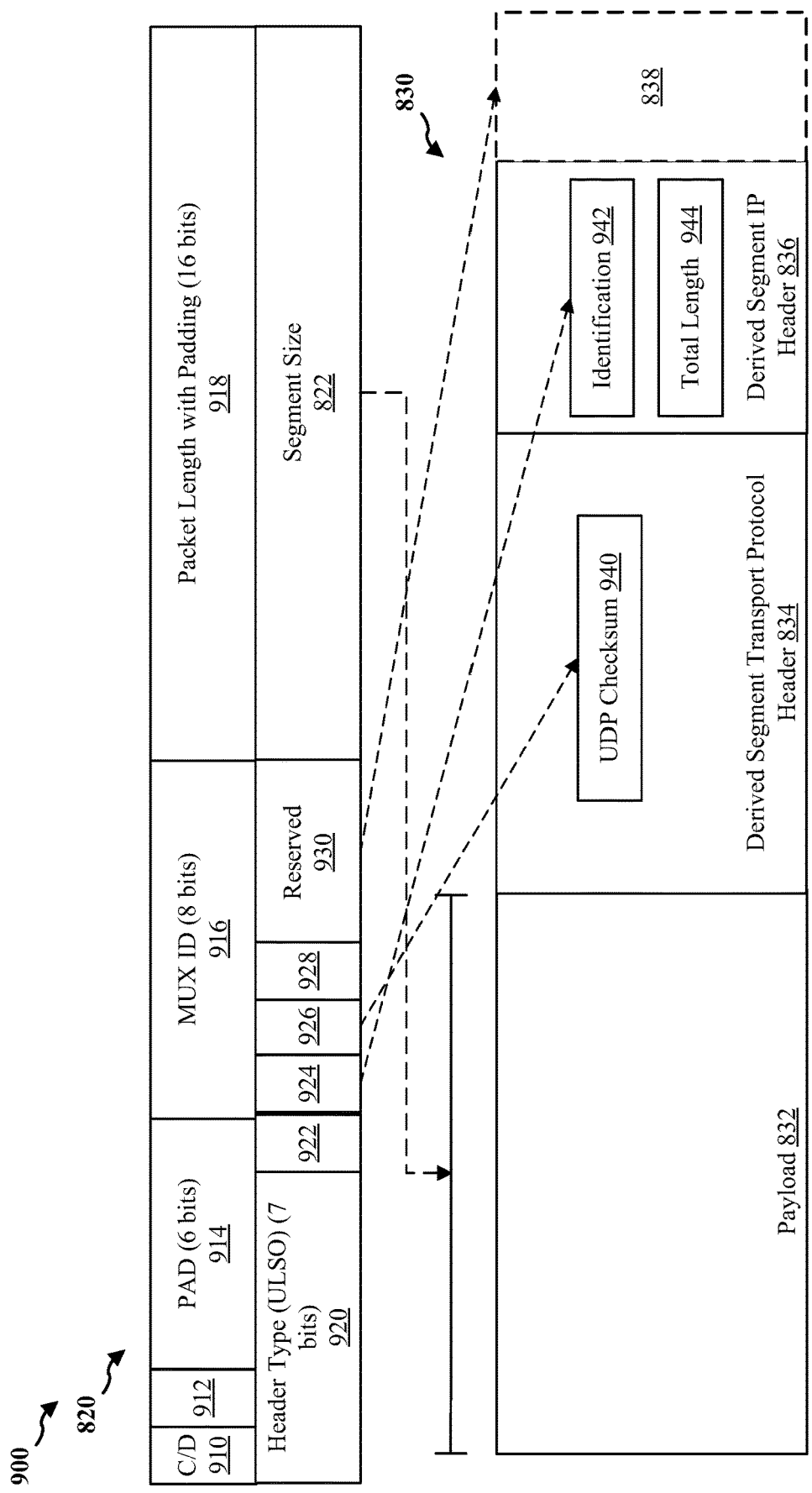
FIG. 9 is a diagram illustrating an example of a segmentation header.

FIG. 9 is a diagram 900 illustrating an example of a segmentation header 820. The segmentation header 820 may be a specific header for the modem component 140. For example, the segmentation header 820 may be a total of 64 bits or 8 octets. The segmentation header 820 may include various parameters for offloading segmentation of uplink packets. In some implementations, any parameter of the segmentation header 820 may be included in the segmentation policy 850 based on negotiation between the host component 120 and the modem component 140. In some implementations, a value in the segmentation header 820 for an IP packet may override a previously negotiated value in the segmentation policy 850.

The segmentation header 820 may include a command or data bit (910) that indicates whether the IP packet 810 is a modem control command or a data packet. The segmentation header 820 may include a reserved bit 912. The segmentation header 820 may include padding bits 914 to achieve alignment of the first 4 octets of the segmentation header 820. The segmentation header 820 may include a multiplexing identifier (MUX ID) 916. The MUX ID 916 may identify a multiplexor channel of the modem. Some values of the MUX ID 916 may be reserved. For example, if a mux is not negotiated, this field is set to 0 and must be ignored by the receiver. If mux is negotiated, MUX ID 916 can be in the range of 1 to 0x7F, where MUX IDs 0 and 0x80-0xFF are reserved. The segmentation header 820 may include a packet length with padding field 918 that indicates the total length of the IP packet 810 excluding the segmentation header 820. The segmentation header 820 may include a header type field 920. The header type field 920 may be set to a value to indicate offloading segmentation of uplink packets. That is, the header type field 920 may identify the segmentation header 820 as indicating segmentation versus other modem operations. The segmentation header 820 may include a next header bit 922, which may be set to 0 for offloading segmentation of uplink packets. The segmentation header 820 may include an IP identifier (IP-ID) configuration bit 924, which may be used with IPv4 packets to indicate whether the identification field 942 of the IPv4 header 410 should be incremented in each segment 830. The segmentation header 820 may include a zero checksum field 926, which may indicate whether a transport protocol checksum is to be set to 0 in each segment 830. In particular, the zero checksum field 926 may be set for UDP over IPv4, where a UDP checksum 940 of the UDP datagram header 710 may be redundant with a header checksum field of the IPv4 header 410. The segmentation header 820 may include a priority bit 928. The segmentation header 820 may include a reserved field 930. In some implementations, the reserved field 930 may indicate a length of the additional header 818, such that the modem component 140 may copy the additional header 818 to the additional header 838. The segmentation header 820 may include the segment size 822. The segment size 822 may specify the maximum size of each payload 832. The modem component 140 may determine the number of segments 830 by dividing the value of the packet length with padding field 918 by the segment size 822.

The modem component 140 may be configured to generate the segments 830 based on the IP packet 810 and segmentation policy 850 (as indicated by the segmentation header 820). The modem component 140 may perform segmentation of uplink packets for TCP and UDP transport protocols and either IPv4 or IPv6.

For IPv4, the modem component 140 may set the total length field 944 of the respective segment IP header 836 based on a total length of the segment 830 that is the payload 832, the transport protocol header 834, the IP header 836 and any additional header 838. The modem component 140 may set the identification field 942 of the segment IP header 836 based on the identification field of the IP header 816 and the IP-ID configuration bit 924. If the IP-ID configuration bit 924 indicates a fixed ID, the modem component 140 may copy the identification field of the IP header 816 to the identification field 942 of each segment IP header 836. If the IP-ID configuration bit 924 indicates an incremental IPID, the modem component 140 may copy the identification field of the IP header 816 to the identification field 942 of the first segment IP header 836*a*, and increment the value of the identification field 942 of the first segment IP header 836*a* for each subsequent segment IP header such as segment IP header 836*b* and 836*c*. In some implementations, the segmentation policy 850 may define minimum and maximum values for the identification field 942 to handle wrap-around. The modem component 140 may calculate the IP header checksum of each segment IP header 836 individually without input from the host component 120. All other fields of the IP header 816 may be copied as-is to each segment IP header 836.

For IPv6, the modem component 140 may set the payload length field of the respective segment IP header 836 based on a length of the payload 832. In some implementations, where the IP header 816 includes an extension header, the modem component 140 may copy the extension header to the segment IP header 836. All other fields of the IP header 816 may be copied as-is to each segment IP header 836.

For TCP, the modem component 140 may set the sequence number of each segment 830. The modem component 140 may calculate the TCP checksum of each segment TCP header 836 individually without input from the host component 120. The modem component 140 may set the flags of each segment 830 base on the order of the respective segment. The modem component 140 may set the FIN flag, the PUSH flag, and the RST flag of a last segment (such as 836*c*) based on a respective flag of the transport protocol header 814. The modem component 140 may set the CWR flag of a first segment protocol header 836*a* based on a CWR flag of the first transport protocol header 814. The modem component 140 may copy an ACK flag and a URG flag from the transport protocol header 814 to each segment transport protocol header 834. All other fields of the transport protocol header 814 may be copied as-is to each segment transport protocol header 834.

For UDP, the modem component 140 may calculate the UDP checksum 940 of each segment UDP header 836 individually. In some implementations, where the zero checksum field 926 indicates a zero checksum, the modem component 140 may set the UDP checksum 940 to zero. The modem component 140 may set the length field of the UDP header 836 based on the actual length of the respective segment 830. All other fields of the transport protocol header 814 may be copied as-is to each segment transport protocol header 834.

In some implementations, the modem component 140 may not support offloading of segmentation for some types of packets. For example, if the IP packet 810 is already an IP fragment, the modem component 140 may not further segment the IP fragment. As another example, in some implementations, only TCP and UDP transport protocols may be supported. In some implementations, if the segment size is set to zero, the packet may not be segmented. If the modem component 140 receives an IP packet 810 for which segmentation is indicated but not supported, the modem component 140 may generate an error message to the host component 120, unless the packet size is less than the MTU size, in which case the IP packet 810 can be transmitted without segmentation.

Referring to FIGS. 10-16, in operation, modem component 140 of an apparatus 1000 may perform a method 1100 of wireless communication, by such as via execution of communications component 1015 by processor 1005 and/or memory 1010. The apparatus 1000 may be a UE or a UE may include the apparatus 1000.

In some aspects, the apparatus 1000 may be configured to perform one or more operations described herein in connection with FIGS. 4 to 9. Additionally or alternatively, the apparatus 1000 may be configured to perform one or more processes described herein, such as method 1100 of FIGS. 11-16. In some aspects, the apparatus 1000 may include one or more components of the UE described above in connection with FIG. 1.

In some aspects, the communications component 1015 may include a set of components, such as a receiving component 1020, a segmenting component 1025, a transmitting component 1030 or a combination thereof. In some implementations, the communications component 1015 may include one or more of negotiating component 1035, updating component 1040, calculating component 1045, copying component 1055, or setting component 1060. Alternatively, the set of components may be separate and distinct from the communications component 1015. In some aspects, one or more components of the set of components may include or may be implemented within a controller/processor, a memory, or a combination thereof, of the UE described above in connection with FIG. 1. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

At block 1102, the method 1100 includes receiving, via an interface with a host, an internet protocol (IP) packet including a first transport protocol header and a first IP header, the IP packet having a size greater than a maximum transport unit (MTU) size allowable for each packet transmitted over a communication link. For example, in an aspect, apparatus 1000, processor 1005 memory 1010, communications component 1015, and/or receiving component 1020 may be configured to or may include means for receiving, via an interface with a host, an internet protocol (IP) packet including a first transport protocol header and a first IP header, the IP packet having a size greater than a maximum transport unit (MTU) size allowable for each packet transmitted over a communication link. For example, the receiving at block 1102 may include copying data from the interface 198 into the memory 1010. Further, for example, the receiving at block 1102 may be performed more efficiently on the IP packet having the size greater than the MTU size than on a plurality of individual IP packets of the MTU size.

At block 1104, the method 1100 includes segmenting the IP packet into a plurality of segments based on a segment size indicated by a segmentation policy for the IP packet for the communication link, each segment including a respective segment transport protocol header derived from the first transport protocol header and a respective segment IP header derived from the first IP header, each of the segment transport protocol headers and each of the segment IP headers including at least one field based on the segmentation policy, and each of the segment transport protocol headers including a checksum for the respective segment. For example, in an aspect, apparatus 1000, processor 1005, memory 1010, communications component 1015, and/or segmenting component 1025 may be configured to or may include means for segmenting the IP packet into a plurality of segments based on a segment size indicated by a segmentation policy for the IP packet for the communication link, each segment including a respective segment transport protocol header derived from the first transport protocol header and a respective segment IP header derived from the first IP header, each of the segment transport protocol headers and each of the segment IP headers including at least one field based on the segmentation policy, and each of the segment transport protocol headers including a checksum for the respective segment.

At block 1106, the method 1100 includes transmitting the plurality of segments over the communication link. For example, in an aspect, apparatus 1000, processor 1005, memory 1010, communications component 1015, and/or transmitting component 1030 may be configured to or may include means for transmitting the plurality of segments over the communication link. For example, the transmitting at block 1106 may include transmitting the plurality of segments over a WWAN according to a wireless transmission protocol stack. As another example, the transmitting at block 1106 may include transmitting according to other link layer protocols such as Ethernet or Wi-Fi. Further, for example, the transmitting at block 1106 may allow segmentation of IP packets according to the link layer protocol of the communication link.

In an aspect, the IP packet includes a segmentation header that indicates the segment size and the segmentation policy is based on one or more fields of the segmentation header. In one example of this aspect, the segmentation header includes a header type field having a value indicating offload of uplink packet segmentation for the IP packet. In another example of this aspect, the segmentation header includes a field having a value indicating a size of an additional header, between the segmentation header and the first IP header, for a link layer protocol.

In an aspect, segmenting the IP packet into the plurality of segments includes selectively incrementing or not incrementing an identification field in the segment IP header in each of the plurality of segments based on the segmentation policy.

In an aspect, each segment transport protocol header is a user datagram protocol (UDP) header, and segmenting the IP packet comprises setting the checksum to zero for each of the plurality of segments based on the segmentation policy.

Figure 12:
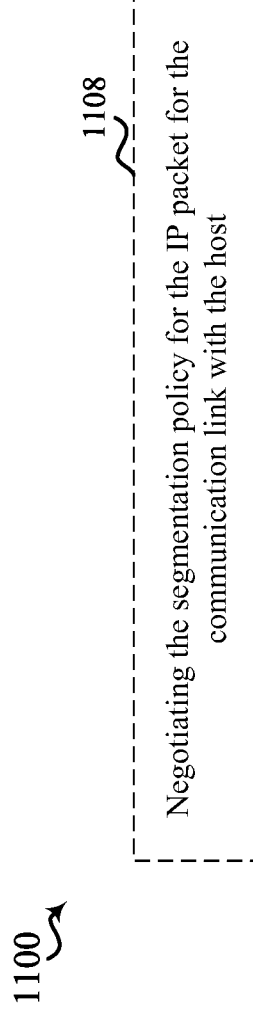
FIG. 12 is a flowchart of an example method for a modem to determine a segmentation policy.

Referring to FIG. 12, in an optional aspect, at block 1108, the method 1100 may further include negotiating the segmentation policy for the IP packet for the communication link with the host. For example, in an aspect, apparatus 1000, processor 1005, memory 1010, communications component 1015, and/or negotiating component 1035 may be configured to or may include means for negotiating the segmentation policy for the IP packet for the communication link with the host. For example, the negotiating at block 1108 may include sending capabilities to the host and receiving an acceptance of a capability or a value consistent with the capabilities. In an aspect, negotiating the segmentation policy includes configuring enablement of offload of uplink packet segmentation for one or more endpoints associated with the communication link. In another aspect, negotiating the segmentation policy includes configuring a range of IP identification values to include in the derived IP header of each of the plurality of segments.

Figure 13:
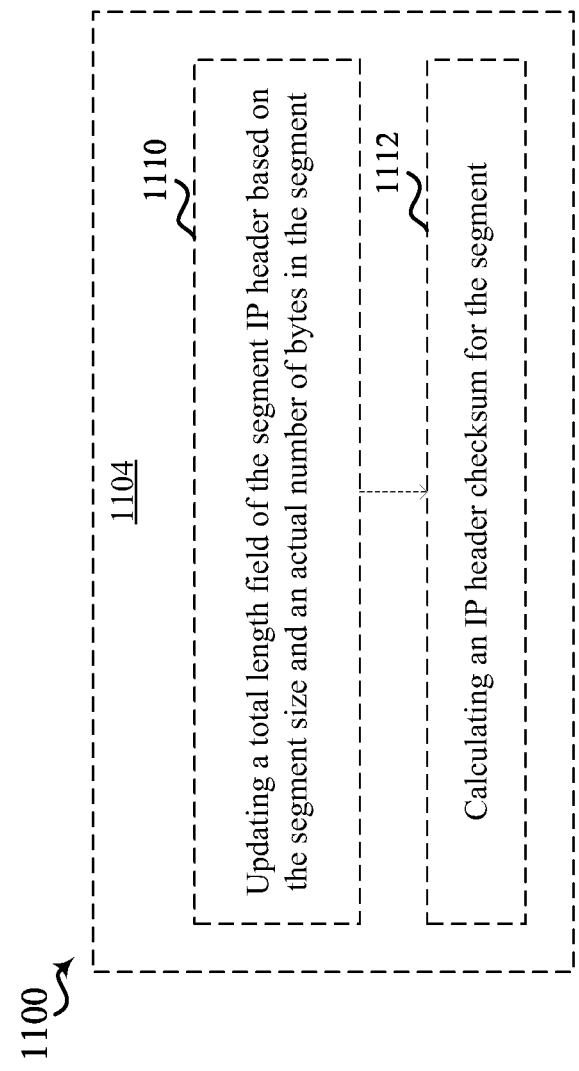
FIG. 13 is a flowchart of an example method of segmenting an IPv4 packet.

Referring to FIG. 13, in an optional aspect where each segment IP header is an IPv4 header, at block 1110, the segmenting of the IP packet into the plurality of segments at block 1104 includes, for each segment, updating a total length field of the segment IP header based on the segment size and an actual number of bytes in the segment. For example, in an aspect, apparatus 1000, processor 1005, memory 1010, communications component 1015, and/or updating component 1040 may be configured to or may include means for updating a total length field of the segment IP header based on the segment size and an actual number of bytes in the segment. For example, the updating at block 1110 may include setting the total length field to the value of the segment size 822 for one or more segments 830 and setting the total length field of a last segment to an actual length of the last segment. Accordingly, the total length field of each segment may indicate the actual length of the respective segment.

In this optional aspect, at block 1112, the segmenting of the IP packet into the plurality of segments at block 1104 includes, for each segment, calculating an IP header checksum for the segment. For example, in an aspect, apparatus 1000, processor 1005, memory 1010, communications component 1015, and/or calculating component 1045 may be configured to or may include means for calculating an IP header checksum for the segment.

Figure 14:
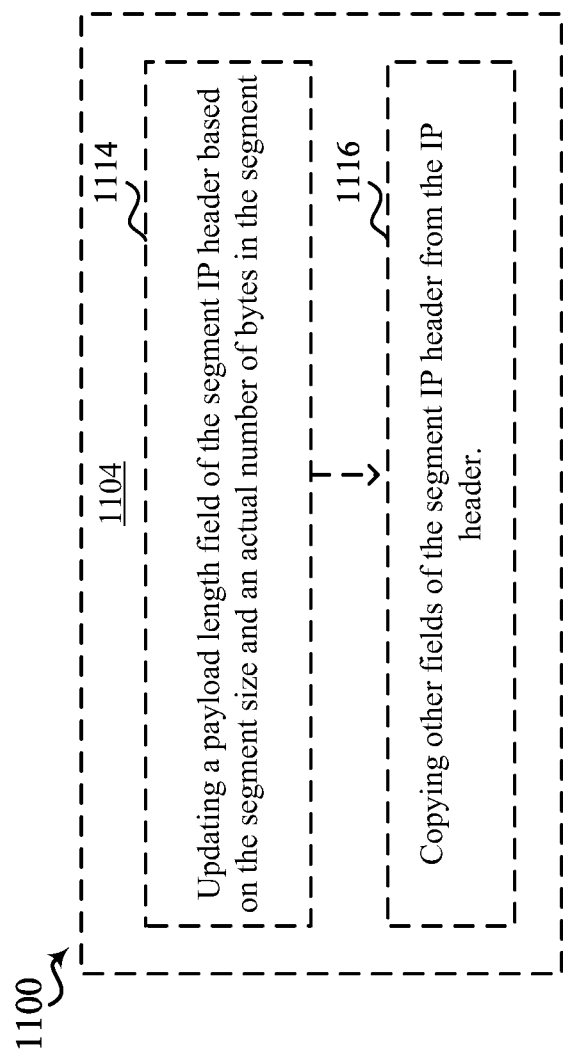
FIG. 14 is a flowchart of an example method of segmenting an IPv6 packet.

Referring to FIG. 14, at block 1114, in an optional aspect wherein the segment IP header is an IPv6 header, the segmenting the IP packet into the plurality of segments at block 1104 includes, for each segment updating a payload length field of the segment IP header based on the segment size and an actual number of bytes in the segment. For example, in an aspect, apparatus 1000, processor 1005, memory 1010, communications component 1015, and/or updating component 1040 may be configured to or may include means for updating a payload length field of the segment IP header based on the segment size and an actual number of bytes in the segment.

In this optional aspect, at block 1116, the segmenting of the IP packet into the plurality of segments at block 1104 includes, for each segment, copying other fields of the segment IP header from the IP header. For example, in an aspect, apparatus 1000, processor 1005, memory 1010, communications component 1015, and/or copying component 1055 may be configured to or may include means for copying other fields of the segment IP header from the IP header.

Figure 15:
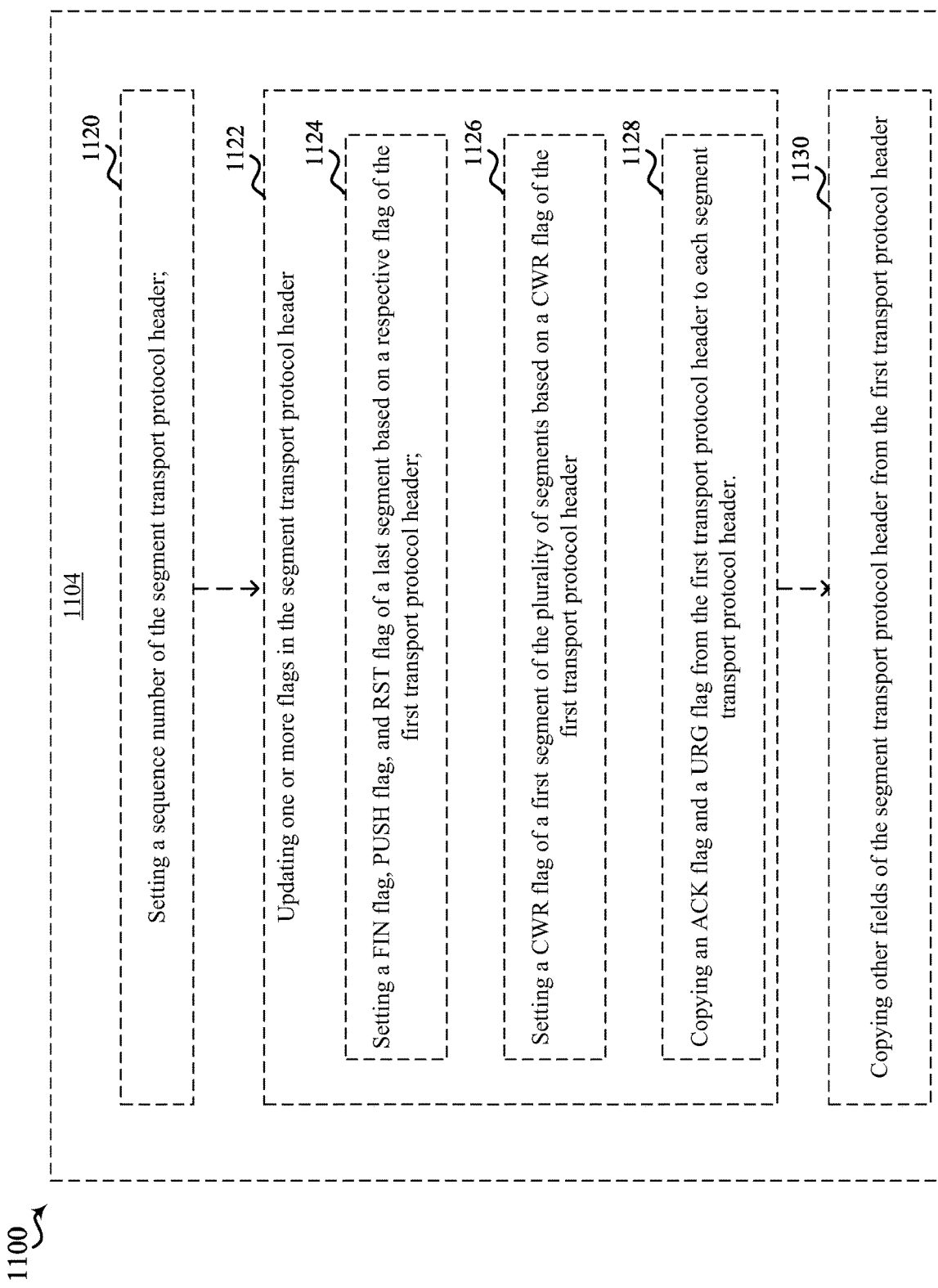
FIG. 15 is a flowchart of an example method of segmenting a TCP segment.

Referring to FIG. 15, at block 1120, in an optional aspect where the first transport protocol header is a transport control protocol (TCP) header, the segmenting of the IP packet into the plurality of segments of block 1104 includes, for each segment, setting a sequence number of the segment transport protocol header. For example, in an aspect, apparatus 1000, processor 1005, memory 1010, communications component 1015, and/or setting component 1060 may be configured to or may include means for setting a sequence number of the segment transport protocol header.

In this optional aspect, at block 1122, the segmenting of the IP packet into the plurality of segments of block 1104 includes, for each segment, updating one or more flags in the segment transport protocol header. For example, in an aspect, apparatus 1000, processor 1005, memory 1010, communications component 1015, and/or updating component 1040 may be configured to or may include means for updating one or more flags in the segment transport protocol header.

For example, in this optional aspect, at block 1124, the updating at block 1122 of the one or more flags in the segment transport protocol header may include setting a FIN flag, PUSH flag, and RST flag of a last segment based on a respective flag of the first transport protocol header. In this optional aspect, at block 1126, the updating at block 1122 of the one or more flags in the segment transport protocol header may include setting a CWR flag of a first segment of the plurality of segments based on a CWR flag of the first transport protocol header. In this optional aspect, at block 1128, the updating at block 1122 of the one or more flags in the segment transport protocol header may include copying an ACK flag and a URG flag from the first transport protocol header to each segment transport protocol header.

Additionally, in this optional aspect, at block 1130, the segmenting of the IP packet into the plurality of segments of block 1104 includes, for each segment, copying other fields of the segment transport protocol header from the first transport protocol header. For example, in an aspect, apparatus 1000, processor 1005, memory 1010, communications component 1015, and/or copying component 1055 may be configured to or may include means for copying other fields of the segment transport protocol header from the first transport protocol header.

Figure 16:
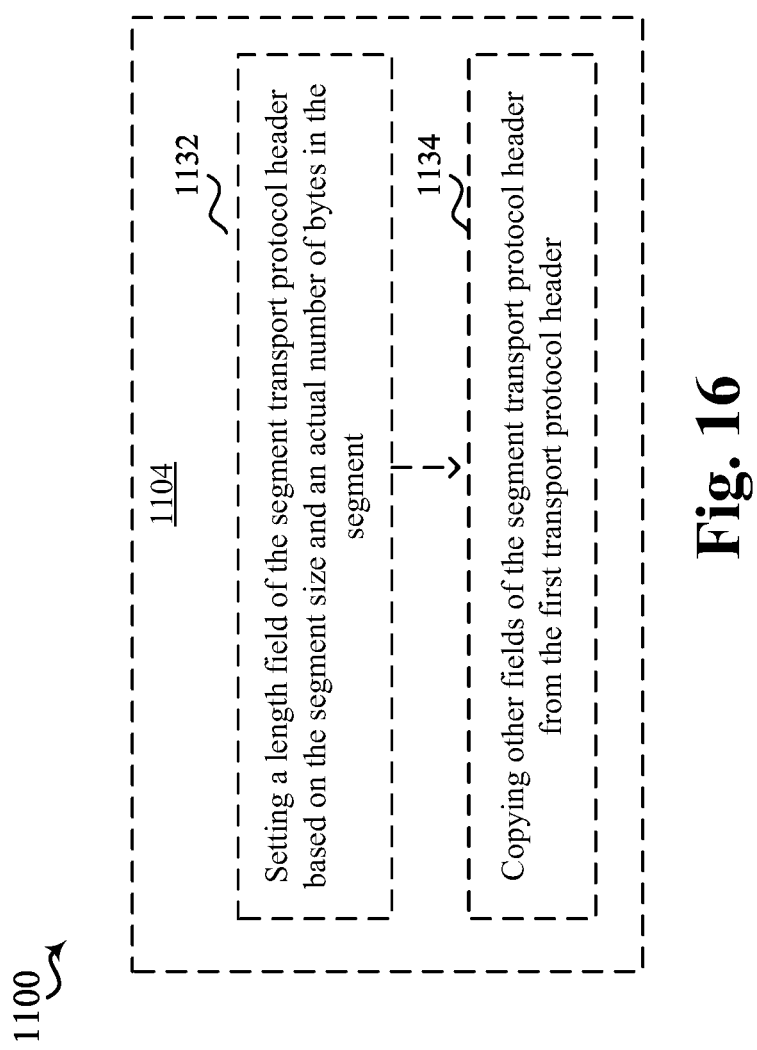
FIG. 16 is a flowchart of an example method of segmenting a UDP datagram.

Referring to FIG. 16, at block 1132, in an optional aspect wherein the first transport protocol header is a user datagram protocol (UDP) header, the segmenting of the IP packet into the plurality of segments of block 1104 includes, for each segment, setting a length field of the segment transport protocol header based on the segment size and an actual number of bytes in the segment. For example, in an aspect, apparatus 1000, processor 1005, memory 1010, communications component 1015, and/or setting component 1060 may be configured to or may include means for setting a length field of the segment transport protocol header based on the segment size and an actual number of bytes in the segment.

In this optional aspect, at block 1134, the segmenting of the IP packet into the plurality of segments of block 1104 includes, for each segment, copying other fields of the segment transport protocol header from the first transport protocol header. For example, in an aspect, apparatus 1000, processor 1005, memory 1010, communications component 1015, and/or copying component 1055 may be configured to or may include means for copying other fields of the segment transport protocol header from the first transport protocol header.

Figure 10:
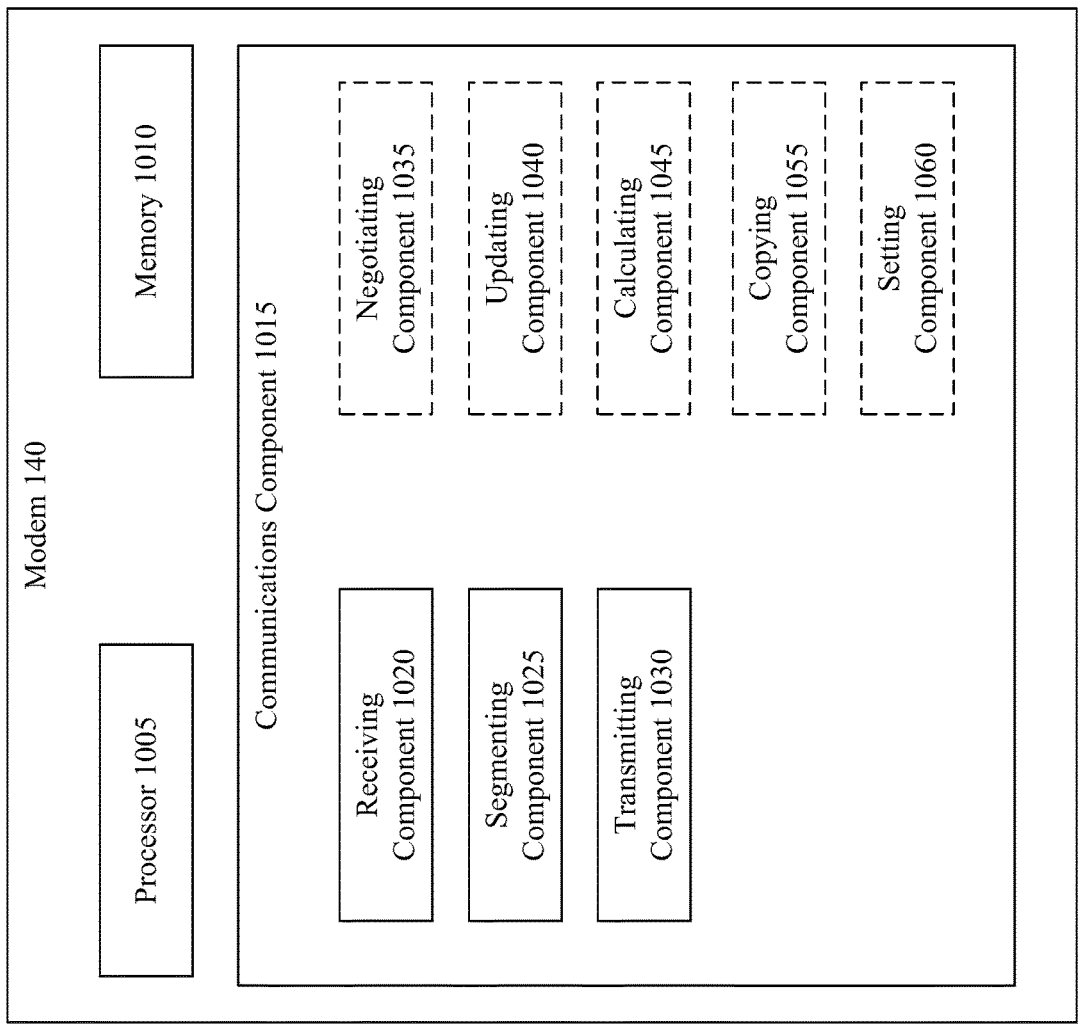
FIG. 10 is a block diagram of an example apparatus, such as a UE, that includes a modem for wireless communication.
Figure 11:
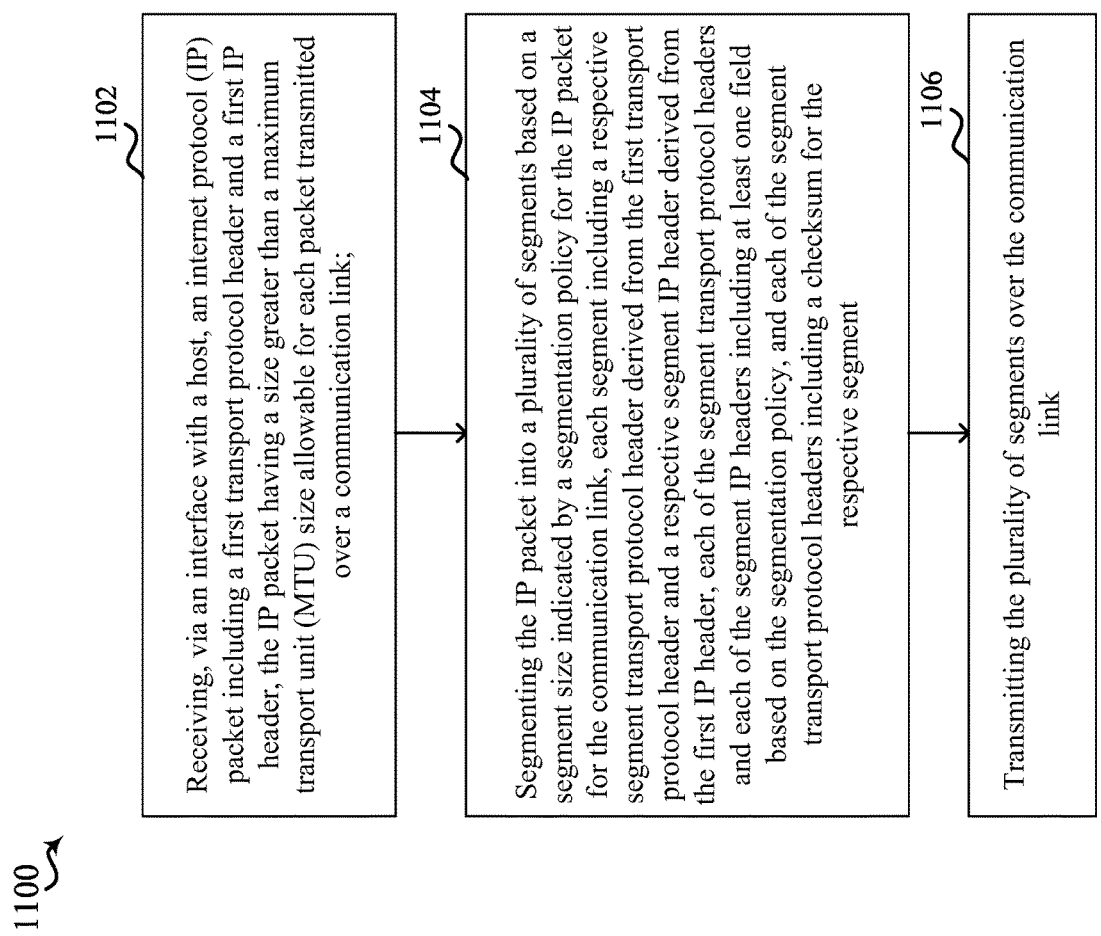
FIG. 11 is a flowchart of an example method for a modem to segment an IP packet into a plurality of segments.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

Referring to FIGS. 17-20, in operation, host component 120 of an apparatus 1700 may perform a method 1800 of wireless communication, such as via execution of communications component 1715 by processor 1705 and/or memory 1710. In some aspects, the apparatus 1700 may be configured to perform one or more operations described herein in connection with FIGS. 4 to 9. Additionally or alternatively, the apparatus 1700 may be configured to perform one or more processes described herein, such as method 1800 of FIGS. 18-20. In some aspects, the apparatus 1700 may include one or more components of the UE described above in connection with FIG. 1.

In some aspects, the communications component 1715 may include a set of components, such as an adding component 1720 and a providing component 1725 or a combination thereof. In some implementations, the communications component 1715 may include one or more of setting component 1730 or negotiating component 1735. Alternatively, the set of components may be separate and distinct from the communications component 1715. In some aspects, one or more components of the set of components may include or may be implemented within a controller/processor, a memory, or a combination thereof, of the UE described above in connection with FIG. 1. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

At block 1802, the method 1800 includes adding a segmentation header indicating offload of uplink packet segmentation to an internet protocol (IP) packet that includes a first transport protocol header and a first IP header, the IP packet having a size greater than a maximum transport unit (MTU) size allowable for each packet transmitted over a communication link by the modem, wherein the segmentation header is based on a segmentation policy including at least a segment size. For example, in an aspect, host component 120, processor 1705, memory 1710, communications component 1715, and/or adding component 1720 may be configured to or may include means for adding a segmentation header indicating offload of uplink packet segmentation to an internet protocol (IP) packet that includes a first transport protocol header and a first IP header, the IP packet having a size greater than a maximum transport unit (MTU) size allowable for each packet transmitted over a communication link by the modem, wherein the segmentation header is based on a segmentation policy including at least a segment size.

At block 1804, the method 1800 includes providing the IP packet, via an interface, to the modem for transmission as a plurality of segments. For example, in an aspect, host component 120, processor 1705, memory 1710, communications component 1715, and/or providing component 1725 may be configured to or may include means for providing the IP packet, via an interface, to the modem for transmission as a plurality of segments.

Referring to FIG. 19, in an optional aspect where the segmentation header includes the segment size, at block 1806, the method 1800 may further include setting one or more fields of the segmentation header based on the segmentation policy. For example, in an aspect, host component 120, processor 1705, memory 1710, communications component 1715, and/or setting component 1730 may be configured to or may include means for setting one or more fields of the segmentation header based on the segmentation policy.

In an optional aspect, the segmentation header may include a field indicating a size of an additional header between the segmentation header and the first IP header for a link layer protocol.

In an optional aspect, the segmentation policy indicates whether to increment an identification field of a respective segment IP header in each of the plurality of segments.

In an optional aspect, the segmentation policy indicates whether to set a user datagram protocol (UDP) header checksum to zero for each of the plurality of segments transmitted by the modem.

Referring to FIG. 20, in an optional aspect, at block 1808, the method 1800 may further include negotiating the segmentation policy for the communication link with the modem. For example, in an aspect, host component 120, processor 1705, memory 1710, communications component 1715, and/or negotiating component 1735 may be configured to or may include means for negotiating the segmentation policy for the communication link with the modem. For example, the negotiating at block 1808 may include receiving an indication of capabilities of the modem, the communication link, or an endpoint from the modem. For example, the modem may provide an API or driver that provides the capabilities. The negotiating may include accepting a capability or selecting a value from the indicated capabilities. Accordingly, the segmentation policy may be negotiated based on the configuration of the modem component 140 and the communication link for the endpoint.

In this optional aspect, at block 1810, the negotiating the segmentation policy at block 1808 may include configuring enablement of offload of uplink packet segmentation for one or more endpoints associated with the communication link.

In this optional aspect, at block 1812, the negotiating the segmentation policy at block 1808 may include configuring a range of IP identification values for the modem to include in a derived IP header of each of the plurality of segments.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

Figure 17:
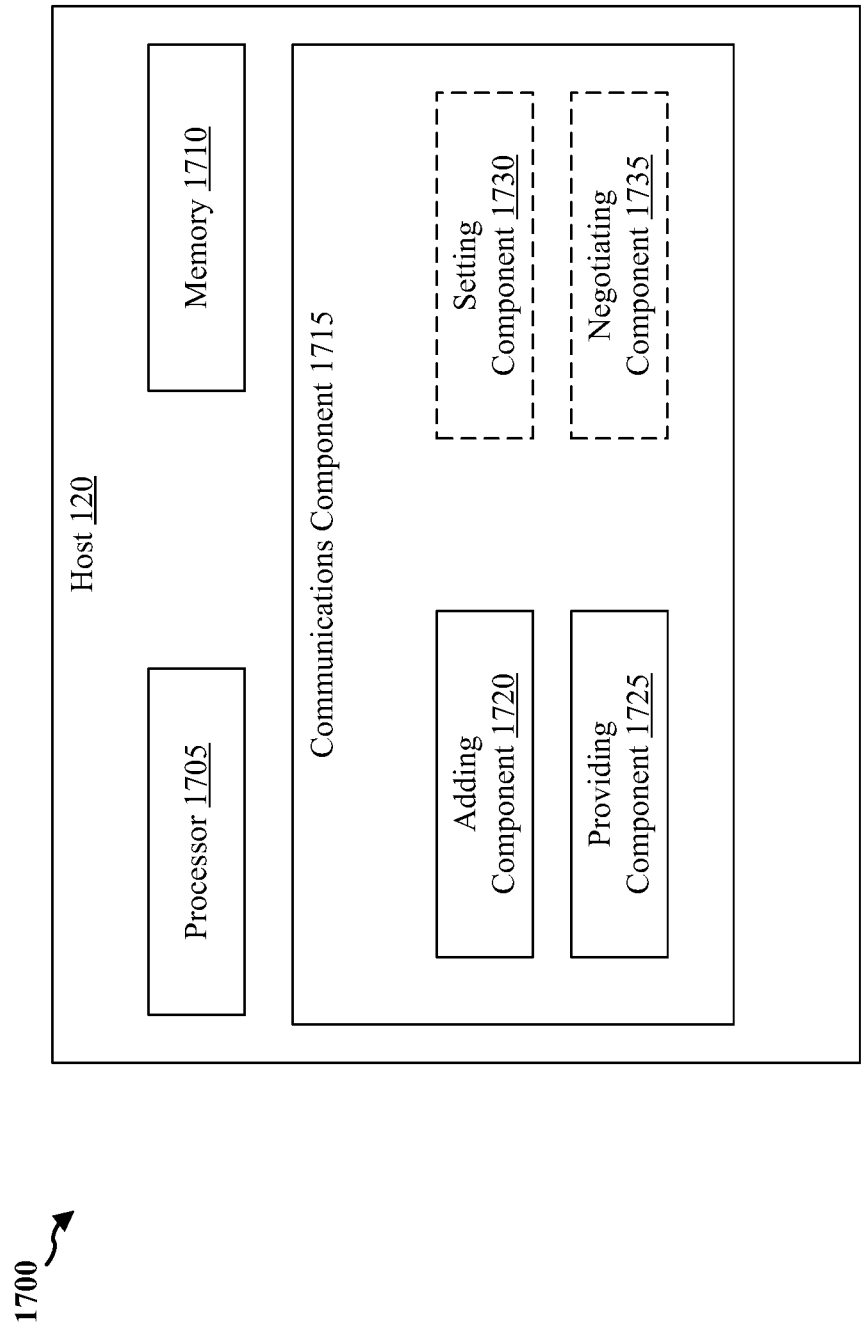
FIG. 17 is a block diagram of an example apparatus, such as a UE, that includes a host configured to offload segmentation of uplink packets to a modem.
Figure 18:
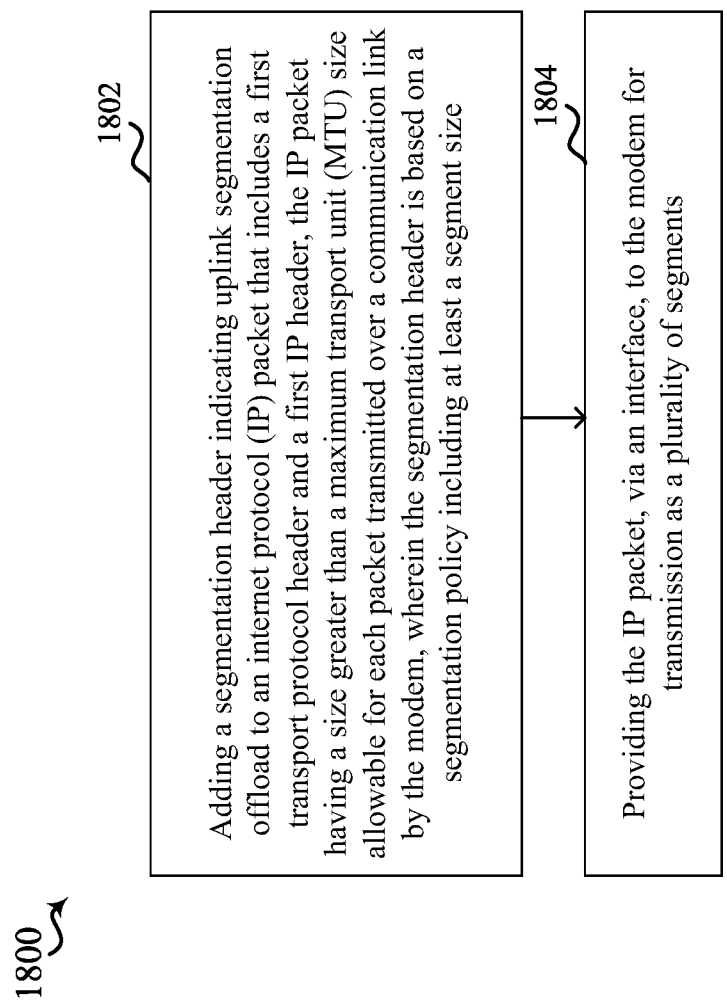
FIG. 18 is a flowchart of an example method for a host to offload segmentation of uplink packets to a modem.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally or alternatively, a set of (one or more) components shown in FIG. 17 may perform one or more functions described as being performed by another set of components shown in FIG. 17.

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person of ordinary skill in the art to practice the various aspects described herein. Various modifications to these aspects will be readily apparent to those of ordinary skill in the art, and the generic principles defined herein may be applied to other aspects. The claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a modem, comprising:
   receiving, via an interface with a host, an internet protocol (IP) packet including a first transport protocol header and a first IP header, the IP packet having a size greater than a maximum transport unit (MTU) size allowable for each packet transmitted over a communication link;
   segmenting the IP packet into a plurality of segments based on a segment size indicated by a segmentation policy for the IP packet for the communication link, each segment including a respective segment transport protocol header derived from the first transport protocol header and a respective segment IP header derived from the first IP header, each of the segment transport protocol headers and each of the segment IP headers including at least one field based on the segmentation policy, and each of the segment transport protocol headers including a respective checksum for the respective segment, wherein segmenting the IP packet into the plurality of segments comprises selectively incrementing or not incrementing a respective identification field in the respective segment IP header in each of the plurality of segments based on the segmentation policy; and
   transmitting the plurality of segments over the communication link.

2. The method of claim 1, wherein the IP packet includes a segmentation header that indicates the segment size and wherein the segmentation policy is based on one or more fields of the segmentation header.

3. The method of claim 2, wherein the segmentation header includes a header type field having a value indicating an uplink segmentation offload for the IP packet.

4. The method of claim 2, wherein the segmentation header includes a field having a value indicating a size of an additional header, between the segmentation header and the first IP header, for a link layer protocol.

5. The method of claim 1, wherein each segment transport protocol header is a user datagram protocol (UDP) header, and segmenting the IP packet comprises setting the respective checksum to zero for each of the plurality of segments based on the segmentation policy.

6. The method of claim 1, further comprising negotiating the segmentation policy for the IP packet for the communication link with the host.

7. The method of claim 6, wherein negotiating the segmentation policy includes configuring enablement of an uplink segmentation offload for one or more endpoints associated with the communication link.

8. The method of claim 6, wherein negotiating the segmentation policy includes configuring a range of IP identification values to include in the derived IP header of each of the plurality of segments.

9. The method of claim 1, wherein each segment IP header is an IPv4 header, and wherein segmenting the IP packet into the plurality of segments comprises, for each segment:
   updating a total length field of the segment IP header based on the segment size and an actual number of bytes in the segment; and
   calculating an IP header checksum for the segment.

10. The method of claim 1, wherein the segment IP header is an IPv6 header, and wherein segmenting the IP packet into the plurality of segments comprises, for each segment:
    updating a payload length field of the segment IP header based on the segment size and an actual number of bytes in the segment; and
    copying other fields of the segment IP header from the IP header.

11. The method of claim 1, wherein the first transport protocol header is a transport control protocol (TCP) header, and wherein segmenting the IP packet into the plurality of segments comprises, for each segment:

setting a sequence number of the segment transport protocol header;
updating one or more flags in the segment transport protocol header; and
copying other fields of the segment transport protocol header from the first transport protocol header.

12. The method of claim 11, wherein updating the one or more flags in the segment transport protocol header comprises:
setting a finish (FIN) flag, push function (PSH) flag, and reset (RST) flag of a last segment based on a respective flag of the first transport protocol header;
setting a congestion window reduced (CWR) flag of a first segment of the plurality of segments based on a CWR flag of the first transport protocol header; and
copying an acknowledgment (ACK) flag and an urgent (URG) flag from the first transport protocol header to each segment transport protocol header.

13. The method of claim 1, wherein the first transport protocol header is a user datagram protocol (UDP) header, and wherein segmenting the IP packet into the plurality of segments comprises, for each segment:
setting a length field of the segment transport protocol header based on the segment size and an actual number of bytes in the segment; and
copying other fields of the segment transport protocol header from the first transport protocol header.

14. An apparatus for wireless communication at a modem, comprising:
one or more memories; and
one or more processors in communication with the one or more memories and, individually or in combination, configured to:
receive, via an interface with a host, an internet protocol (IP) packet including a first transport protocol header and a first IP header, the IP packet having a size greater than a maximum transport unit (MTU) size allowable for each packet transmitted over a communication link, the IP packet including a segmentation header that includes one or more fields that indicate a segment size;
negotiate a segmentation policy for the IP packet for the communication link with the host based on the one or more fields of the segmentation header, the segmentation policy indicating the segment size;
segment the IP packet into a plurality of segments based on the segmentation policy including the segment size, each segment including a respective segment transport protocol header derived from the first transport protocol header and a respective segment IP header derived from the first IP header, each of the segment transport protocol headers and each of the segment IP headers including at least one field based on the segmentation policy, and each of the segment transport protocol headers including a respective checksum for the respective segment; and
transmit the plurality of segments over the communication link.

15. The apparatus of claim 14, wherein the segmentation header includes a header type field having a value indicating an uplink segmentation offload for the IP packet.

16. The apparatus of claim 14, wherein the segmentation header includes a field having a value indicating a size of an additional header, between the segmentation header and the first IP header, for a link layer protocol.

17. The apparatus of claim 14, wherein to segment the IP packet into the plurality of segments comprises selectively incrementing or not incrementing a respective identification field in the respective segment IP header in each of the plurality of segments based on the segmentation policy.

18. The apparatus of claim 14, wherein each segment transport protocol header is a user datagram protocol (UDP) header, and the one or more processors, individually or in combination, are configured to set the respective checksum to zero for each of the plurality of segments based on the segmentation policy.

19. A method of wireless communication by a host of a modem, comprising:
adding a segmentation header indicating uplink segmentation offload to an internet protocol (IP) packet that includes a first transport protocol header and a first IP header, the IP packet having a size greater than a maximum transport unit (MTU) size allowable for each packet transmitted over a communication link by the modem, wherein the segmentation header is based on a segmentation policy including at least a segment size; and
providing the IP packet, via an interface, to the modem for transmission as a plurality of segments.

20. The method of claim 19, wherein the segmentation header includes the segment size, and further comprising setting one or more fields of the segmentation header based on the segmentation policy.

21. The method of claim 20, wherein the segmentation header includes a field indicating a size of an additional header between the segmentation header and the first IP header for a link layer protocol.

22. The method of claim 19, wherein the segmentation policy indicates whether to increment an identification field of a respective segment IP header in each of the plurality of segments.

23. The method of claim 19, wherein the segmentation policy indicates whether to set a user datagram protocol (UDP) header checksum to zero for each of the plurality of segments transmitted by the modem.

24. The method of claim 19, further comprising negotiating the segmentation policy for the communication link with the modem.

25. The method of claim 24, wherein negotiating the segmentation policy includes configuring enablement of uplink segmentation offload for one or more endpoints associated with the communication link.

26. The method of claim 24, wherein negotiating the segmentation policy includes configuring a range of IP identification values for the modem to include in a derived IP header of each of the plurality of segments.

27. An apparatus for wireless communication by a host of a modem, comprising:
one or more memories; and
one or more processors in communication with the memory and, individually or in combination, configured to:
add a segmentation header indicating uplink segmentation offload to an internet protocol (IP) packet that includes a first transport protocol header and a first IP header, the IP packet having a size greater than a maximum transport unit (MTU) size allowable for each packet transmitted over a communication link by the modem, wherein the segmentation header is based on a segmentation policy including at least a segment size; and provide the IP packet, via an interface, to the modem for transmission as a plurality of segments.

\* \* \* \* \*